United States Patent [19]

Pedicini

[11] Patent Number: 5,362,577
[45] Date of Patent: Nov. 8, 1994

[54] DIFFUSION VENT FOR A RECHARGEABLE METAL-AIR CELL

[75] Inventor: Christopher S. Pedicini, Marietta, Ga.

[73] Assignee: AER Energy Resources, Inc., Atlanta, Ga.

[21] Appl. No.: 71,844

[22] Filed: Jun. 4, 1993

[51] Int. Cl.⁵ ...................... H01M 2/12; H01M 12/06
[52] U.S. Cl. ........................................ 429/27; 429/72; 429/86
[58] Field of Search ................. 429/27, 72, 82, 84, 429/86, 89

[56] References Cited

U.S. PATENT DOCUMENTS

| | | |
|---|---|---|
| 2,452,066 | 10/1948 | Murphy . |
| 3,746,580 | 8/1971 | Aker et al. . |
| 3,853,629 | 12/1974 | Elliot . |
| 3,897,265 | 7/1975 | Jaggard . |
| 3,904,441 | 9/1975 | Badger . |
| 4,054,726 | 10/1977 | Sauer et al. ................. 429/27 X |
| 4,105,830 | 8/1978 | Kordesch . |
| 4,118,544 | 10/1978 | Przybyla et al. . |
| 4,189,526 | 2/1980 | Cretzmeyer et al. . |
| 4,262,062 | 4/1981 | Zatsky . |
| 4,343,869 | 8/1982 | Oltman et al. ................. 429/27 |
| 4,925,744 | 5/1990 | Niksa et al. . |

Primary Examiner—Anthony Skapars
Attorney, Agent, or Firm—Jones & Askew

[57] ABSTRACT

A vent system for exhausting gas generated within a battery case is provided. The vent system exhausts gas from the battery case while maintaining the hermetic seal of the case. The vent system provides a small gas exit hole that is sufficiently small to prevent electrolyte leakage and also intake of excess carbon dioxide or excess water vapor from the atmosphere. Also, various combinations of gas-permeable, hydrophobic membranes and diffuser material may cover the gas exit hole to provide humidity control for the battery while exhausting gases from the battery. A recess may be provided within the case such that the gas exit hole communicates between the atmosphere and the recess. Also, various combinations of gas-permeable, hydrophobic membranes and diffuser material may cover the recess and gas exit hole to provide humidity control for the battery while exhausting gases from the battery case. The present invention also provides a vent system in which gas-permeable, hydrophobic membranes and diffuser material may fill an opening so as to exhaust gas from the case. The present invention also provides an electrode lead which extends along the battery case and through the seam of the battery case in a manner in which a hermetic seal is provided around the lead. The manufacturing process for the seal around the lead is relatively simple.

49 Claims, 6 Drawing Sheets

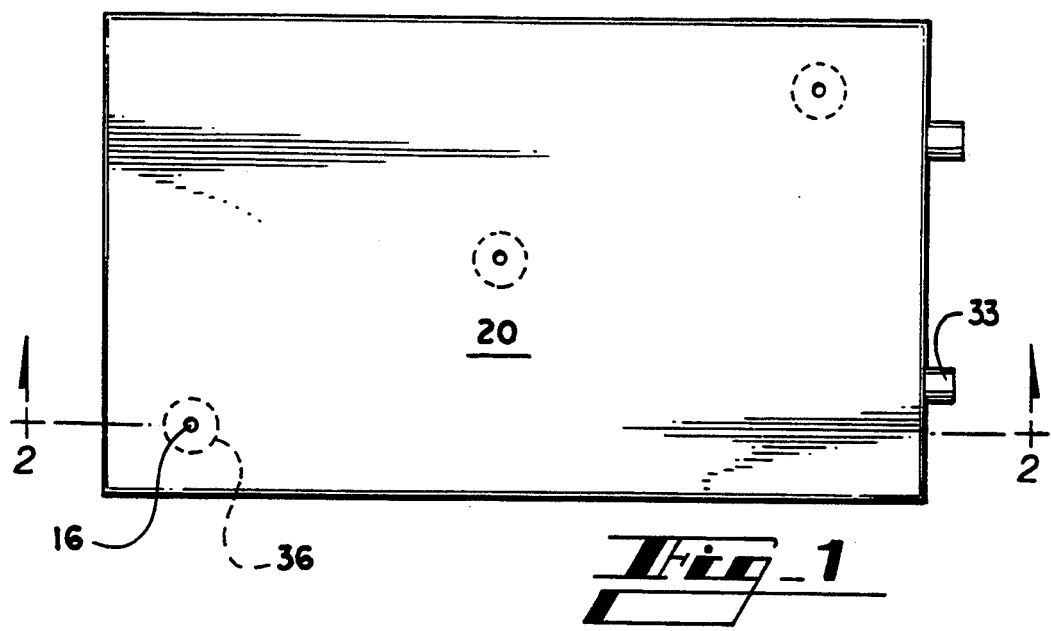
Fig_1
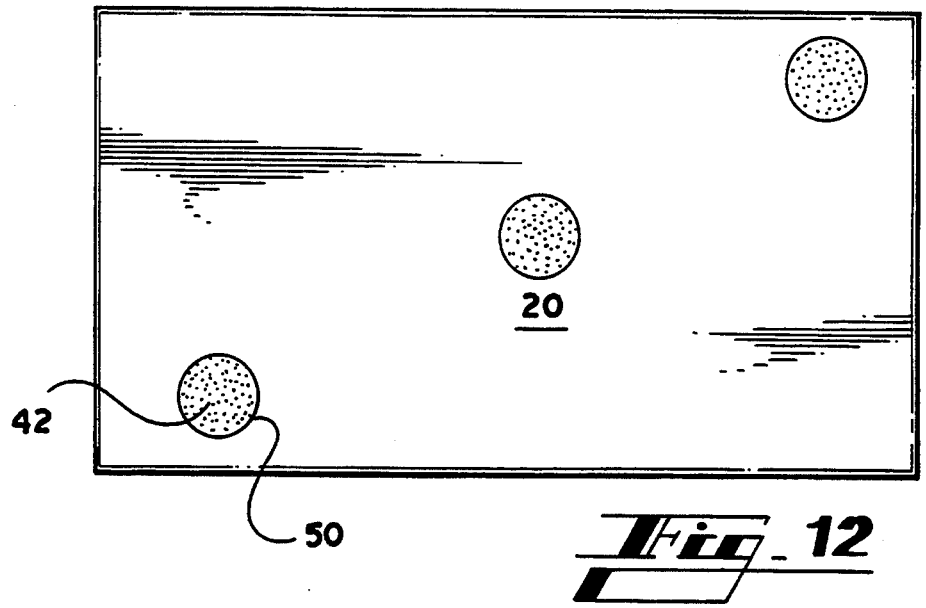
Fig_12
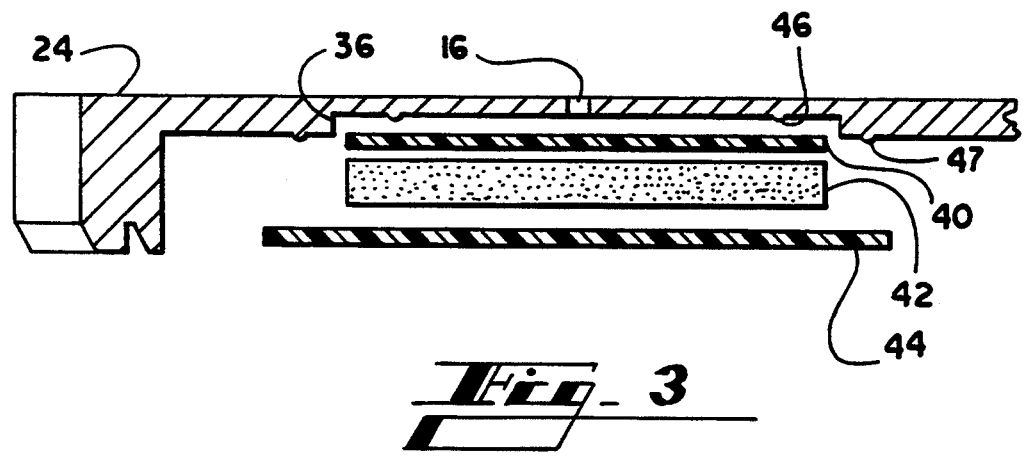
Fig_3

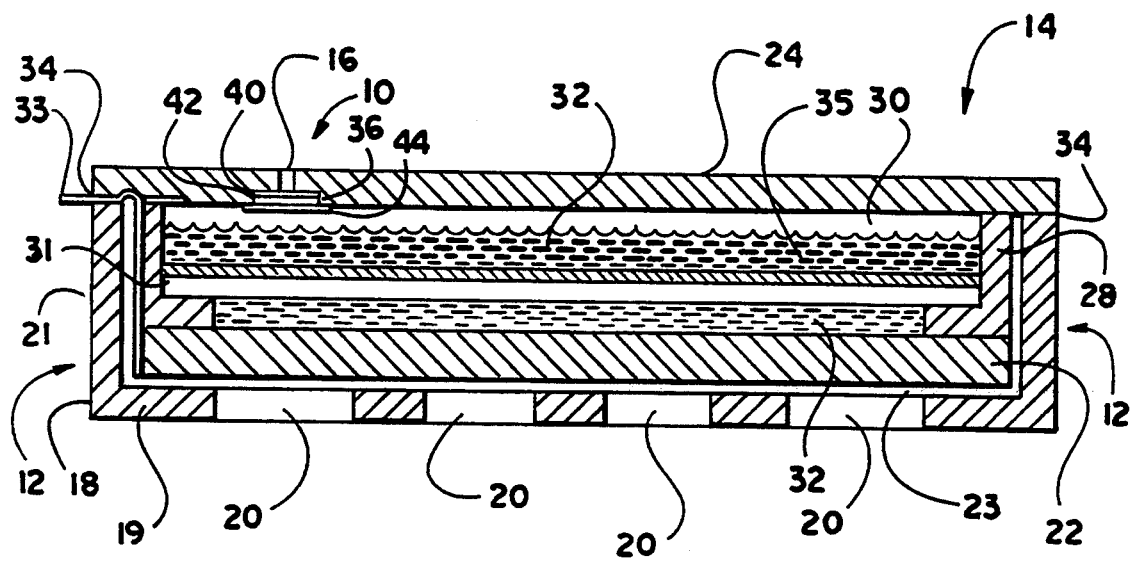
_Fig_2
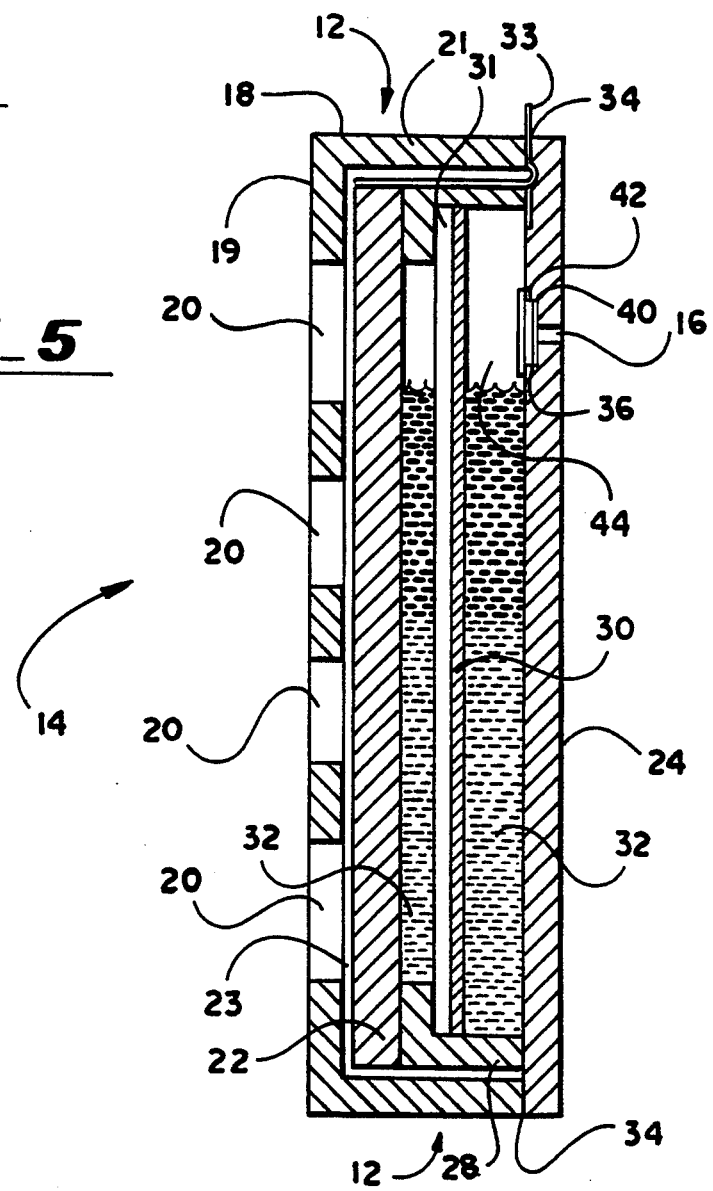
_Fig_5

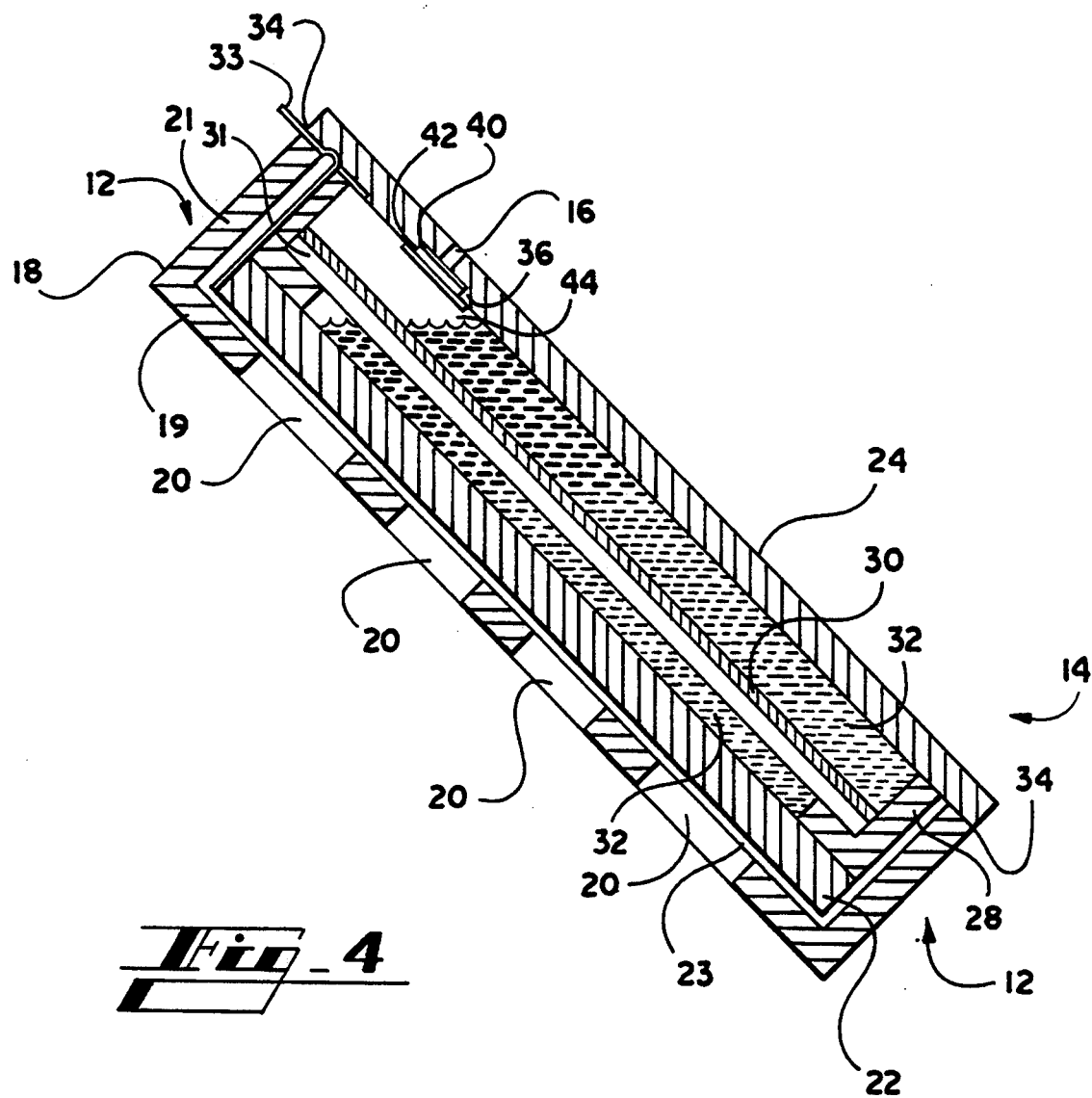
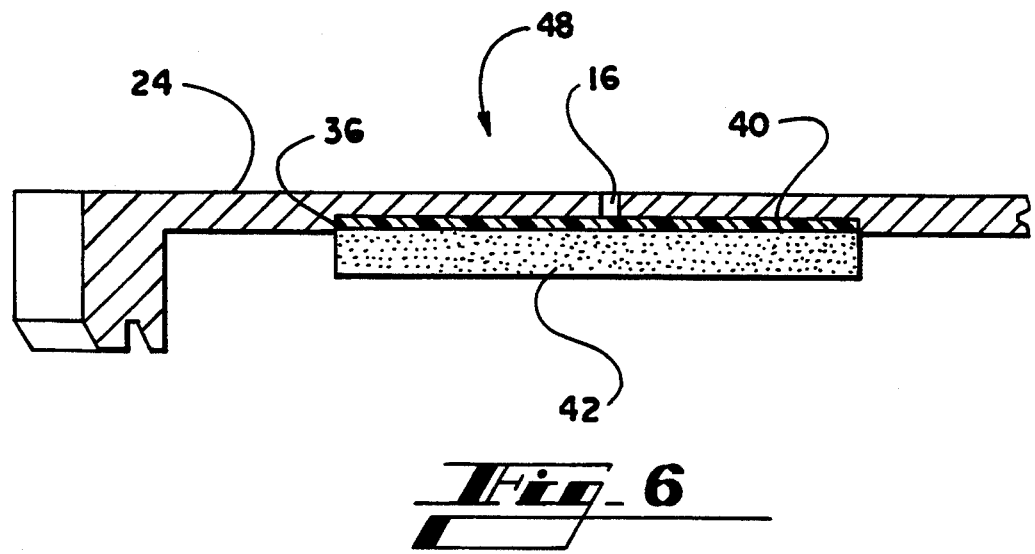

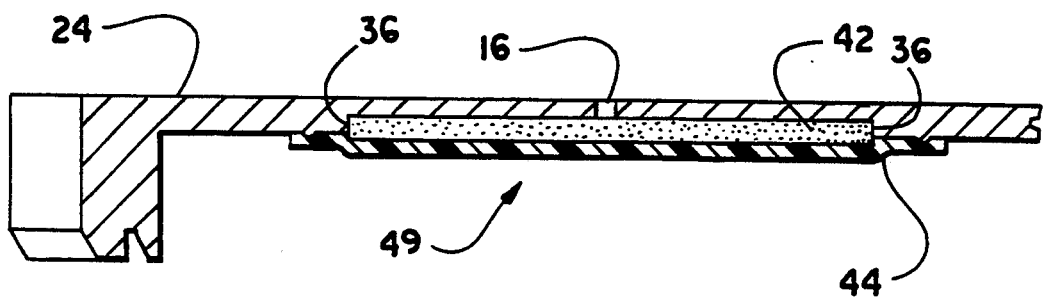
Fig_7
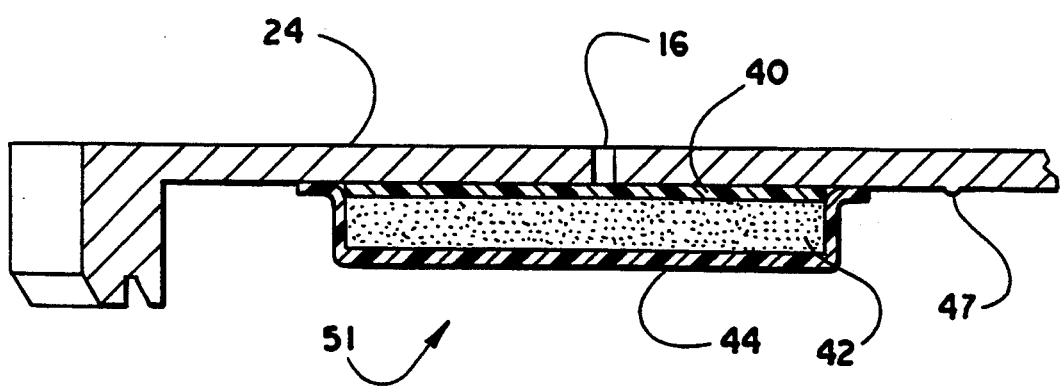
Fig_8
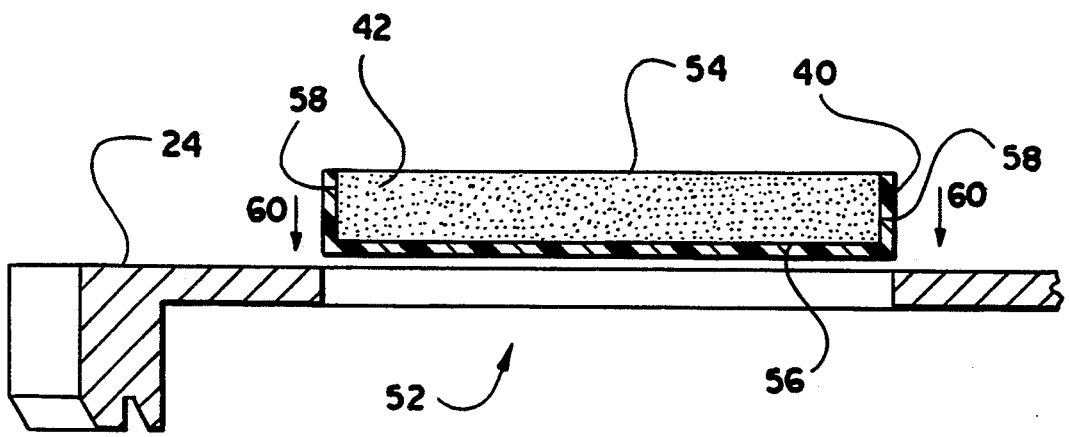
Fig_9A

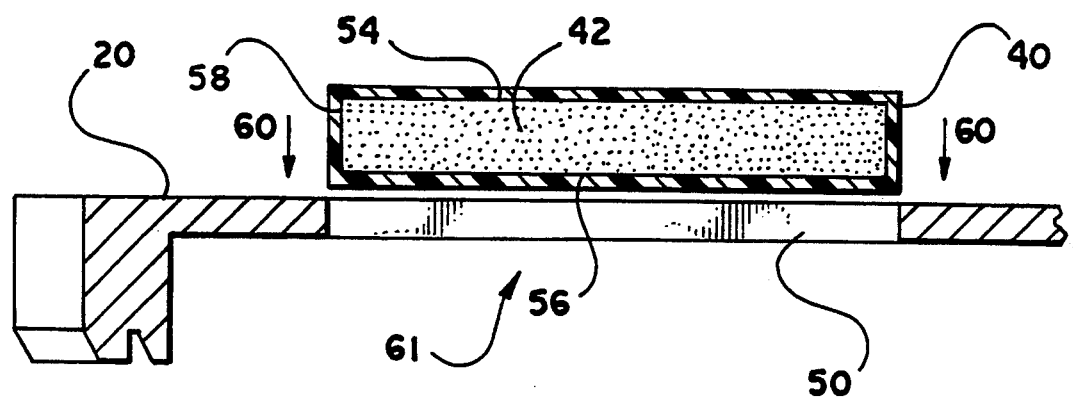
Fig_11A
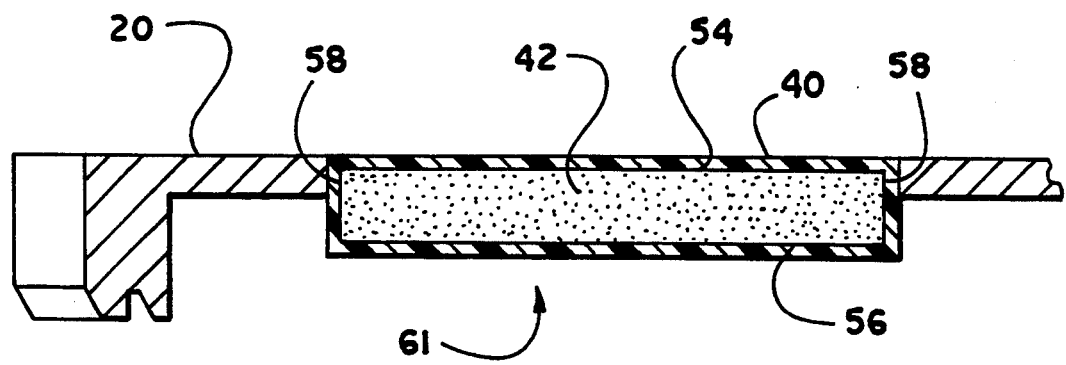
Fig_11B
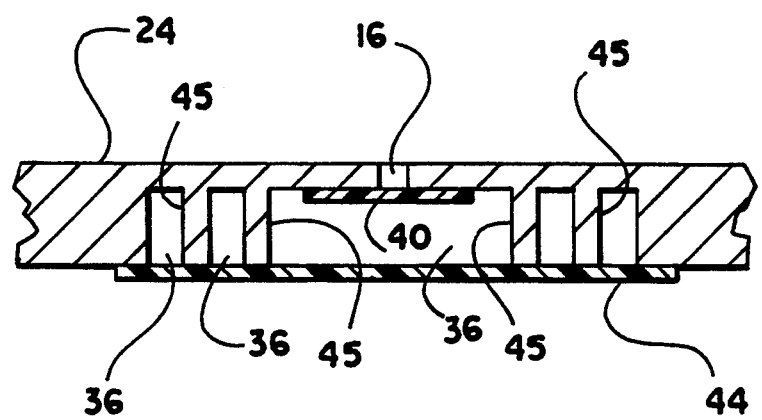
Fig_13

DIFFUSION VENT FOR A RECHARGEABLE METAL-AIR CELL

TECHNICAL FIELD

This invention relates generally to electrochemical cells and, more particularly, to vent systems for gas generated by an electrochemical cell, such as a metal-air cell.

BACKGROUND OF THE INVENTION

During the operation of an electrochemical cell, various gases are released during the electrochemical reaction which may pressurize the case housing the cell. The pressure build-up due to the released gases can hamper cell operation thus making exhaustion of these gases important to cell operation. Relieving gas pressure is particularly important in metal-air cells. Metal-air cells include an air permeable cathode and a metallic anode separated by an aqueous electrolyte. For example, during operation of a zinc-air battery, oxygen from the ambient air is converted at the cathode to hydroxide ions, zinc is oxidized at the anode, reacts with hydroxide ions, and water and electrons are released to provide electrical energy. During this electrochemical reaction, various gases are released within the cell structure and, consequently, gas pressure increases in the structure with continued use. Because the cathode is not usually capable of supporting very high hydrostatic pressures (typically less than 2 psi), the gases generated within the cell case should be vented at low pressures to protect the cathode. While venting the gases is possible through mechanical devices, these devices must open and close and thus reseal after venting. By opening and closing a mechanical seal, the hermeticity of the battery is sacrificed which makes control of electrolyte leakage and equilibrium vapor pressure more difficult. The leakage and equilibrium vapor pressure would vary depending upon the size of the opening as well as the length of time in which the mechanical device was open. The ambient air which enters the cell through the opening may cause the metal-air cell to fail due to a condition called flooding or drying out depending upon the relative humidity of the ambient air. If the relative humidity of the ambient air is high, then the battery may fail due to flooding. However, if the relative humidity of the ambient air was low, then the battery may fail due to drying out. Also, environmental contaminants, such as carbon dioxide, may enter through an opening with a mechanical sealing mechanism.

Various structures have been implemented that vent gases generated from within a cell without using a re-sealing mechanical device. For example, U.S. Pat. No. 3,853,629 to Elliot, U.S. Pat. No. 3,904,441 to Badger, and U.S. Pat. No. 2,452,066 to Murphy, disclose such systems. Elliot discloses wrapper members which enclose battery cells. The wrapper members are made of an inner layer which is pervious to gases generated by the cell and an outer layer which is impervious to liquids and which is less pervious than the inner layer to gases generated by the cell. The inner and outer layers are laminated together except for a portion between the layers that serves as a passageway to vent gases generated in the interior of the battery. The inner layer serves as a mechanism to dissolve or diffuse gas in the layer. The unlaminated gas passageway is shown to open to the atmosphere at opposite exterior edges of the battery. The unlaminated gas passageway may vary in width, length and configuration depending on the application. While Elliot discloses a membrane in which gases dissolve or diffuse before exiting the cell through an unlaminated passageway, Elliot's gas exit passageway has a large surface area which exposes the inner wrapper to relatively large amounts of outside air.

Badger discloses a battery vent system particularly for use in automotive type storage batteries. Badger discloses a battery cover that has a plurality of openings which are covered by a microporous filter material. The microporous filter material is then covered by a guard member such that gas may pass laterally through the filter material to the atmosphere. In one embodiment, the gas passes up through the filter material into an elongate chamber open at both ends. Badger also exposes large areas of the filter material to the atmosphere.

Murphy discloses a gas diffusion device for storage batteries. The storage battery is made of several battery cells which each have a vent to allow the passage of gas through a porous diffusion member which may be made of sheet asbestos or sheet wool. A supplementary cover extends for some distance beyond an opening on all sides and serves to protect the diffusion member from accidental mechanical injury or deposit of dirt or other foreign matter. Murphy also exposes the diffusion member to large amounts of ambient air.

Providing a hermetic seal around leads which extend through a battery case is also important in reducing the effects that ambient air may have on a battery. In plastic cell cases, it is often a difficult manufacturing task to extend an electrode lead through an opening in the plastic case in a manner that provides a leak proof seal around the electrode. This is especially true when the case is formed in two parts joined at a seam, and one of the two electrodes of the cell is located within the battery case in a plane that is spaced from the plane in which the seam lies. In battery cells that have electrodes placed in this manner, a hole may be provided in the cell case near the electrode that is farthest from the seam of the battery case. However, it is difficult to pass the lead through the opening and provide a hermetic seal.

Various prior art structures disclose cathode leads which pass through the seam of a cell case. The cases are manufactured in a manner which provides a hermetic seal around the electrode lead. U.S. Pat. No. 3,026,365 to Hughes et al. discloses electric primary cells with cathode supports consisting of expanded or perforated nickel sheet. Each support has an outwardly directed pigtail or lead from the anode or cathode. The casing for the cell consists of pressed thermo-plastic sheets which may be polyvinyl chloride or other impermeable alkali-resistant material. The cathode is placed in a cathode casing section with its lead extending beyond the casing. Similarly, the anode with its extending lead is placed in an anode casing section. Both the cathode and anode casings have flanges around the periphery of the casing. A highly plasticized polyvinyl chloride is placed between the cathode and anode assemblies. Even pressure is imposed to the flanges of the two casing sections to form a fluid-tight and hermetically sealed assembly with the leads extended beyond the casing. Migration of the plasticizer from the membrane placed between the anode and cathode permits the flanges of the anode and cathode casing to be welded together. The flanges of the casing are then cut near the outwardly directed leads. While Hughes discloses an electrode lead extending through the seam of the cell case, Hughes does not deal with the problem of an electrode lead that is not aligned with a seam. Furthermore, Hughes requires flanges to be provided which must be cut after heating, as well as requiring a plasticized membrane between the casing sections to obtain the hermetic seal.

U.S. Pat. No. 4,664,994 to Koike et al. discloses an enclosed lead storage battery having a positive plate, negative plates and a separator and electrolyte held in position by a plate assembly. Leads for the battery assembly are coated with an epoxy resin which is then dried. A polyolefin resin having an excellent adhesiveness to epoxy resin is injection molded around the lead post so as to form a fitted doughnut shaped structure around the lead. The leads are then welded to their respective positive or negative plate. A jacket made of various kinds of synthetic resin is then heat sealed around the plate assembly and the extending leads. The jacket encloses the leads around the fitted doughnut shaped structures formed around the leads. While Koike discloses an electrode lead extending through the seam of the cell case, Koike requires that a polyolefin resin be molded around the electrode leads before sealing the leads with the case. Hughes and Koike require material additional to the casing to provide a seal around the outwardly directed leads of the cell.

Thus there is a need in the art for a vent system for an electrochemical cell which exposes the cell only to a small amount of ambient air while venting gases in a manner which maintains the hermeticity of the cell. There is also a need in the art for a cell case in which the manufacturing of a hermetically sealed electrode lead is straightforward and reliable.

SUMMARY OF THE INVENTION

Generally described, the present invention provides a system for venting gas from within a case housing an electrochemical cell. A cell case constructed according to the present invention has at least one gas exit hole defined from the exterior of the case to the interior of the case, the gas exit hole being sufficiently small to prevent excessive carbon dioxide intake from the atmosphere and to prevent excessive water loss from the battery, and a gas collection area defined by a recess formed in the case wall or by a gas diffuser attached to the case.

More particularly, the cross-sectional area of the gas exit hole is preferably 0.0008 square inches. In connection with the gas diffuser embodiment, the present invention may further provide a gas-permeable, hydrophobic membrane attached to the interior surface of the case so as to cover the gas diffuser thereby defining a boundary for the gas collection area. The present invention may further provide a second gas-permeable, hydrophobic membrane located between the gas diffuser and the interior surface of the case. Preferably, the pore size of pores in the gas diffuser range approximately from 1–20 microns. The gas exit hole is preferably located at the geometric center of the gas diffuser and preferably the perimeter of the gas diffuser is circular in shape.

Another embodiment of the present invention provides at least one recess defined on the interior surface of the case, the recess extending towards the exterior surface of the case so as to define a gas collection area, and at least one gas exit hole communicating with the atmosphere, having a smaller cross-sectional area than the cross-sectional area of the recess and extending from the exterior surface of the case to the recess. The present invention may further provide a gas-permeable, hydrophobic membrane attached to the interior surface of the case so as to cover the recess thereby defining a boundary of the gas collection area or may provide a gas-permeable membrane within the recess so as to cover the gas exit hole. The present invention may further utilize a gas diffuser which is retained or attached within the recess so as to cover the gas exit hole. The gas diffuser may be made of a material that will provide structural support to the case. Preferably, the diameter of the pores of the gas diffuser range approximately from 1–20 microns. In the preferred embodiment of the present invention a gas-permeable, hydrophobic membrane is attached to the interior surface of the case and covers the gas diffuser and a second gas-permeable, hydrophobic membrane covers the gas exit hole and is located between the gas diffuser and the gas exit hole. The gas exit hole is preferably located at the geometric center of the recess, and preferably, the perimeter of the recess is circular in shape. Preferably, the cross-sectional area is at least approximately 0.4 square inches.

Another embodiment of the vent system of the present invention provides an opening defined in the case and a gas diffuser positioned to fill the opening. The present invention also provides a gas-permeable, hydrophobic membrane which covers the diffuser interior surface to help maintain the humidity within the case. The membrane covering the interior surface of the gas diffuser may also extend to cover the peripheral surfaces of the gas diffuser which fits into the opening, or the entire diffuser surface. The diameter of the pores of the diffuser range approximately from 1–20 microns. Preferably, the cross-sectional area of the opening is approximately 0.4 square inches.

The present invention may provide spaced apart gas exit holes to insure that gas may be exhausted from the case when the case is oriented in varying positions. An electrolyte partially fills the volume of the case and thereby defines a fluid volume and a gas volume within the case. The case may have an initial horizontal position which is defined by the position in which the gas exit holes, located on a surface of the case, face upward. The plurality of gas exit holes are spaced apart such that when the case is tilted to a 90° orientation from the horizontal position at least one of the gas exit holes is located above the maximum fluid level for that position and communicates with the gas volume. Each of the gas exit holes may be covered by a gas-permeable, hydrophobic membrane attached to the case. The case may comprise a plurality of case sections sealed together thereby defining a closed cell case, and in which at least one of the gas exit holes extends through at least one of the case sections. The gas exit holes are preferably aligned in a diagonal array from one corner of the perimeter of the case to an oppositely opposed corner of the case. Also, the gas exit holes may be positioned near the corners of the perimeter of the case, preferably with an exit hole also near the center of the case.

According to another aspect of the invention, a hermetically sealed air cathode lead is provided. The lead extends from the air cathode along a side wall to a seam of the cell case, and then out of the cell at the seam, which is welded to form a seal around the lead. Preferably the lead is perforated and plastic material is bonded through the openings in the lead.

It is an object of the present invention to provide a vent system which exhausts gases generated within a battery case.

It is a further object of the present invention to provide a vent system which exhausts gases generated within a battery while maintaining the hermetic seal of the battery.

It is a further object of the present invention to provide a vent system which exhausts gases generated within a battery while preventing excess water loss or gain within the battery.

It is a further object of the present invention to provide a vent system which exhausts gases generated within a battery while minimizing carbon dioxide intake.

It is a further object of the present invention to provide an arrangement of gas exit holes which communicates with the gas volume within a battery case regardless of the orientation of the case.

It is a further object of the present invention to provide an electrode lead which is hermetically sealed and simple to manufacture.

Other objects, features, and advantages of the present invention will become apparent upon review of the following detailed description of preferred embodiments of the invention, when taken in conjunction with the drawing and the appended claims.

BRIEF DESCRIPTION OF THE DRAWINGS

FIG. 1 shows a top view of a cell case section embodying the vent arrangement of the preferred embodiment of the present invention.

FIG. 2 shows a cross-sectional view of a metal-air cell embodying the preferred embodiment of the vent system of the present invention.

FIG. 3 shows an exploded cross-sectional view of a portion of the cell wall shown in FIG. 1, showing the vent system of the present invention.

FIG. 4 shows the metal-air cell shown in FIG. 2 oriented at an angled position.

FIG. 5 shows the metal-air cell shown in FIG. 2 oriented in a vertical position.

FIGS. 6-8 show cross-sectional views of alternate embodiments of the vent system of the present invention.

FIG. 9a shows an exploded cross-sectional view of an alternate embodiment of the present invention.

FIG. 10b shows an assembled view of the alternate embodiment of FIG. 10a.

FIG. 11a shows an exploded cross-sectional view of another embodiment of the present invention.

FIG. 11b shows an assembled view of the alternate embodiment of FIG. 11.

FIG. 12 shows a top view of a cell case embodying the vent arrangement of any of the alternate embodiments of the present invention shown in FIGS. 9-11.

FIG. 13 shows a partial cross-sectional view of an alternate embodiment of the present invention.

DETAILED DESCRIPTION OF THE INVENTION

Figure 9B:
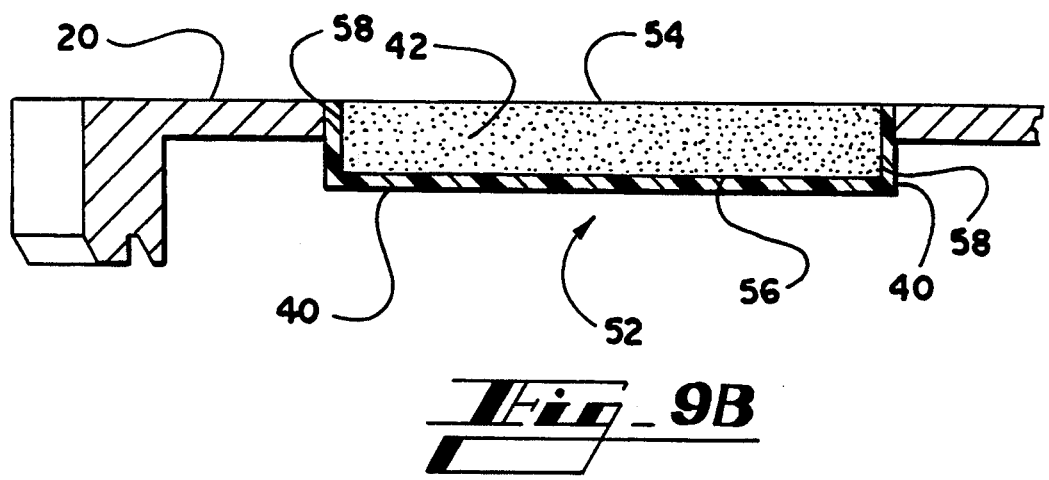
FIG. 9b shows an assembled view of the alternate embodiment of FIG. 9.

Referring to the drawings, in which like numerals represent like parts throughout the several views, FIG. 1 and FIG. 2 show the preferred embodiment of the vent system 10 embodied in a cell case 12 for a metal-air cell 14. One or more vent systems 10 provide for exhausting excess gas generated by the cell 14 from within the cell case 12 in order to prevent excess pressure from building within the cell case 12. A gas exit hole 16 associated with each vent 10 extends through the cell case to provide a means for exhausting gases generated during operation of the metal-air cell 14.

Depicted in FIG. 2 are the various components of the metal-air cell 14. The cell case 12 includes a case body 18 consisting of a horizontal grid 19 defining a plurality of openings 20, and an upwardly extending peripheral side wall 21. An air cathode 22 is disposed within the cell case body 18, along the bottom of the cell case body 21. The openings 20 expose the cathode 22 to the atmosphere. A gas-permeable, hydrophobic membrane 23 extends along the interior of the cell case 12 between the cathode 22 and the openings 20 and along the sidewall 21 to prevent electrolyte leakage and/or moisture from exiting the cell 14, while allowing air to pass through for reaction at the cathode 22. A cathode support 28 secures the cathode 22 in position in the cell case body 18 as well as containing and supporting: an anode screen 30; an absorbent separator material 31; and an electrolyte 32. A cell lid 24 encloses the cell body 18 and meets the body 18 along a seam 34. An electrode lead 33 extends from the cathode 22 along the side wall 21 and through the seam 34, between the lid 24 and the cell side wall 21. The aqueous electrolyte 32 partially fills the cell case 12 thereby defining a liquid volume within the cell case 12. The remaining non-solid volume defines a gas volume that may change positions within the cell case 12 depending upon the volume of the cell case 12 filled by the aqueous electrolyte 32. The aqueous electrolyte 32 preferably fills approximately three quarters of the non-solid volume of the cell case 12. In FIG. 2, the liquid level is indicated by a dashed lines 35.

During operation of cell 14, the reaction that occurs with the ambient air and cathode 22, the electrolyte 32, and the anode screen 30 release various gases within the metal-air cell case 12. Consequently, the cell case 12 becomes pressurized and very high hydrostatic pressures may build. Typically, the air-permeable cathode is not usually capable of supporting very high hydrostatic pressures, which makes the venting of excessive gases important to the operation of the metal-air cell 14. While it is possible to vent gases from within a cell case by opening and resealing a portion of a cell case, the hermeticity of the cell would sacrificed.

Referring to FIG. 3, an exploded view of the preferred embodiment of the vent system 10 is illustrated. The preferred embodiment of the vent system 10 shown embodied in the cell lid 24 comprises: a small gas exit hole 16; a recess 36 within the cell case section; a gas-permeable, hydrophobic membrane 40; a porous gas diffuser 42; and a gas-permeable, hydrophobic membrane 44. Within the recess 36, the gas-permeable hydrophobic membrane 40 is attached to the surface of the recess 36 such that the membrane 40 covers the gas exit hole 16. The recess 36 is preferably circular in shape. A gas diffuser 42 having a plurality of pores is placed adjacent to the membrane 40 within the recess 36 so as to cover the gas exit hole 16. The other membrane 44 may be attached to the interior surface of the cell case 12 so as to cover the recess 36 and the gas diffuser 42 which is fitted within the recess 36.

The membrane 40 is preferably attached to the recess 36 at weld points 46 by ultrasonic welding techniques.

A suitable membrane which has characteristics suitable for ultrasonic welding is a polypropylene membrane sold under the trademark Celgard 4599 which is available from Hoechet Celanese Corporation in Charlotte, N.C. The membrane preferably has a wetting angle of 90°. With a 90° wetting angle, liquid beads more readily than with a smaller wetting angle. The beading of liquid on the membrane alloys gases generated in the cell to pass through the membrane. If the liquid did not bead on the membrane, a liquid layer could form across the membrane and thus prevent gas from exiting the cell. The membrane 44 may be a polypropylene material such as Celgard 2400 from the same supplier.

The porous diffuser 42 may be held within the recess 36 by the membrane 44 which is also ultrasonically welded to the interior surface of the cell case 12 at weld points 47. Rather than being retained within the recess 36 by the membrane 44 the porous diffuser 42 may be also attached to the recess 36 by ultrasonic welding techniques. A gas diffuser suitable for use with the present invention is made of polyethylene and is available under the trademark Porex from Porex Corporation in Fairburn, Ga. It should be appreciated that the membranes 40, 44 and the gas diffuser 42 may be retained or attached within the recess by other welding techniques known to those skilled in the art, or may be retained by adhesives, bonding materials, clamps or fasteners known by those skilled in the art.

The vent system 10 of the present invention has a two fold function: to exhaust excess gas from the cell case 12; and to maintain the hermetic seal of the case 12 so that contaminants do not enter the cell and so that electrolyte is retained within the cell 14 during exhaustion of gas. This purpose is facilitated by the relatively large ratio of the gas collection area to the exit hole area for each vent. The embodiment of the present invention which utilizes a recess provides a gas collection area which may be defined by a membrane without a diffuser. When a diffuser is used within the recess, the thin portion of the cell lid that results from the recess may be structurally supported or strengthened by the use of the diffuser. An important aspect of the preferred embodiment of the present invention is that the vent system 10 uses hydrophobic material to maintain the hermeticity of the case 14.

During the electrochemical reaction of the cell 14, hydrogen is released and becomes pressurized within the cell 14. While it is desirable to release the hydrogen generated during operation of the cell 14, it is undesirable to vent the water vapor generated as the cell 14 could dry out. The gas-permeable, hydrophobic membrane 44 passes hydrogen gas but substantially prevents the water vapor from exiting the cell 14. For any small amount of water vapor that passes through the gas-permeable, hydrophobic membrane 44, the gas diffuser further impedes the migration of such water vapor from the cell 14. The diameter of the pores of the gas diffuser 42 preferably ranges from 1-20 microns. By using a gas diffuser 42 with a large surface area, a large gas collection area is provided which also provides a greater distance of impedance through which water vapor must pass, thereby retaining more water vapor within the cell than is otherwise possible with gas-permeable, hydrophobic membranes 40 and 44 alone. The gas-permeable, hydrophobic membrane 40 located within the recess 36 immediately covering the gas exit hole 16 provides a further means for preventing electrolyte leakage from the cell 14 as well as being a barrier to prevent water and contaminants from entering the cell 14 from the atmosphere.

While it is desirable to prevent electrolyte or water from within the cell from exiting the cell 14, it is also important that an excessive amount of water vapor or carbon dioxide from the atmosphere does not enter the cell case 12 through the gas exit hole 16. Carbon dioxide is undesirable because it neutralizes the electrolyte within the cell. The gas exit hole 16 extends from the exterior surface of the case 12 to the recess 36 so as to communicate with the atmosphere. Because the gas exit hole 16 is in constant communication with the atmosphere and because the water vapor pressure and the contents of the atmosphere are not easily controlled, the vent system 10 provides mechanisms to limit potential adverse effects of a gas exit hole which openly communicates with the atmosphere. The small size of the exit hole 16 and the hydrophobic membranes 40 and 44 prevent excess water and carbon dioxide from entering the cell 14 in the same manner as they prevents excess water from exiting the cell case 12, as discussed above. If excess water vapor were allowed to enter the cell case 12, then the metal-air cell 14 could fail due to flooding.

In addition to the protection provided by the hydrophobic membranes 40 and 44, the cross-sectional area of the gas exit hole 16 is smaller than the cross-sectional area of the recess 36. Further, the gas exit hole 16 is preferably very small so that carbon dioxide intake from the atmosphere is minimized as well as diffusion of water vapor from the atmosphere. Preferably, the gas exit hole is approximately 0.0008 square inches but may range from 0.0003 to 0.008 square inches and is preferably located at the geometric center of the recess 36. Preferably, the cross-sectional area of the recess 36 is approximately 0.2 square inches and circular in shape. Gas within the cell may collect in the recess 36 from a relatively large area and then escape through the small exit hole 16. It should be appreciated by those skilled in the art that the size of the gas exit hole 16 may be varied according to level of sensitivity of the battery components to atmospheric contaminants. Thereby, the vent system 10 of the preferred embodiment of the present invention provides multiple mechanisms within the one system to maintain optimum operating conditions within the cell 14 while exhausting the gases generated within the cell 14.

Referring again to FIG. 1, a top view of the preferred embodiment of the vent system of the present invention is shown. The gas exit holes 16 are shown at spaced apart locations along the cell lid 24. The case may have an initial horizontal position which is defined by the position in which the gas exit holes, located on a surface of the case, face upward. Because the electrolyte 32 partially fills the cell case 12, the gas exit holes 16 are preferably spaced apart in a manner such that if the cell case 12 is oriented or positioned such that the electrolyte covers one of the gas exit holes 16, another gas exit hole 16 will be free to communicate with the gas volume defined within the cell case 12. That is, because gas vapor rises above the electrolyte 32, at least one gas exit hole 16 will be positioned to communicate with the gas volume such that at least one gas exit hole 16 is above the maximum fluid level of the electrolyte fluid volume for the positions of orientation of the cell case 12 at least up to a 90° vertical orientation of the case from the horizontal position. FIGS. 4 and 5 show different orientations o f the cell 14.

Depending upon the shape of the cell case 12, the position of the gas exit holes 16 may vary for a given amount of electrolyte 32. Preferably, the gas exit holes 16 are aligned in a diagonal array as shown in FIG. 1 but may also be positioned near the edges or corners of the cell case 12. It should be appreciated that the number of gas exit holes 16 and the position of gas exit holes 16 may vary depending upon the amount of electrolyte 32 used within the cell case 12 and depending upon the shape and contents of the cell case 12. Also, the number of gas exit holes 16 may vary according to the cross-sectional area of the gas exit holes 16. As the cross-sectional area of the gas exit holes 16 decrease, more gas exit holes 16 may be needed to exhaust a given amount of gas generated within the cell case 12.

As shown in FIG. 13, when no diffuser member 42 is placed in the recess 36 between the membranes 40 and 44, a plurality of posts 45 integrally molded with the case lid 24 may be provided. The posts 45 extend to support the membrane 44 against the pressure of the electrolyte 32 within the cell. The posts 45 may be arranged within the recess 36 to allow flow of gas to the exit hole 16 and so as not to block too much surface area of the membrane 44.

Referring to FIG. 6, an alternate embodiment of the present invention is shown. The vent system 48 shown in FIG. 6 comprises a gas exit hole 16; a recess 36; one gas-permeable, hydrophobic membrane 40 located within the recess 36, and a porous gas diffuser 42 attached within the recess 36 by the methods of retaining the diffuser 42 discussed above.

Referring to FIG. 7, another embodiment of a vent system 49 comprises a gas exit hole 16 communicating between the atmosphere and the recess 36, the gas diffuser 42 located within the recess 36, and the gas-permeable, hydrophobic membrane 44 attached to the interior surface of the cell case 12 and covering the gas diffuser 42 and recess 36.

Referring to FIG. 8, another embodiment of a vent system 51 is illustrated without the recess 36. In FIG. 6, gas exit hole 16 extends from the exterior surface of the cell case 12 to the interior surface of the cell case 12 so as to communicate with the gas-permeable, hydrophobic membrane 40 which is attached to the interior surface of the cell case 12 and covers the gas exit hole 16. The porous gas diffuser 42 is placed adjacent to the gas-permeable, hydrophobic membrane 40 so as to cover the gas exit hole 16. Another gas-permeable, hydrophobic membrane 44 may be attached to the interior surface of the cell case 12 so as to cover gas diffuser 42 as shown.

It should be appreciated that the embodiments shown in FIGS. 6-8 and 13 provide similar cell vent control mechanisms, as discussed above, through the use of various combinations and structures of the gas-permeable, hydrophobic membranes, gas exit holes, recesses, diffuser materials, and cell case sections. The moisture control for any given structure will vary depending upon the combination of, number of, or size of the various components used as part of the vent system 10. The embodiments illustrated are given by way of example, and many variations may be readily discerned by those skilled in the art and fall within the scope of the present invention.

Referring to FIG. 9a, another embodiment of a vent system 52 of the present invention is shown. In FIG. 9a, an opening 50 is defined in the cell case 12 and extends through the exterior surface of the cell case 12 to the interior surface of the cell case 12. The gas diffuser 42 has a diffuser exterior surface 54 and a diffuser interior surface 56 connected by a diffuser peripheral surface 58 therebetween so as to define the volume of the diffuser 42. The diffuser 42 may be positioned to fill the opening 50 such that the diffuser exterior surface 54 communicates with the atmosphere. A gas-permeable, hydrophobic membrane 40 covers the diffuser peripheral surface 58 and the diffuser interior surface 56 so as to help maintain the equilibrium vapor pressure of the cell 14. The diffuser 42 may be tightly fitted within the opening 50 so as to fill opening 50 with the diffuser exterior surface 54 substantially parallel with the cell lid 24 or substantially within the same plane as the cell lid 24. The diffuser 42 may thereby enclose the opening 50 so as to become an integral part of the cell case 12. FIG. 9b depicts an assembled view of the embodiment shown in FIG. 9.

Figure 10A:
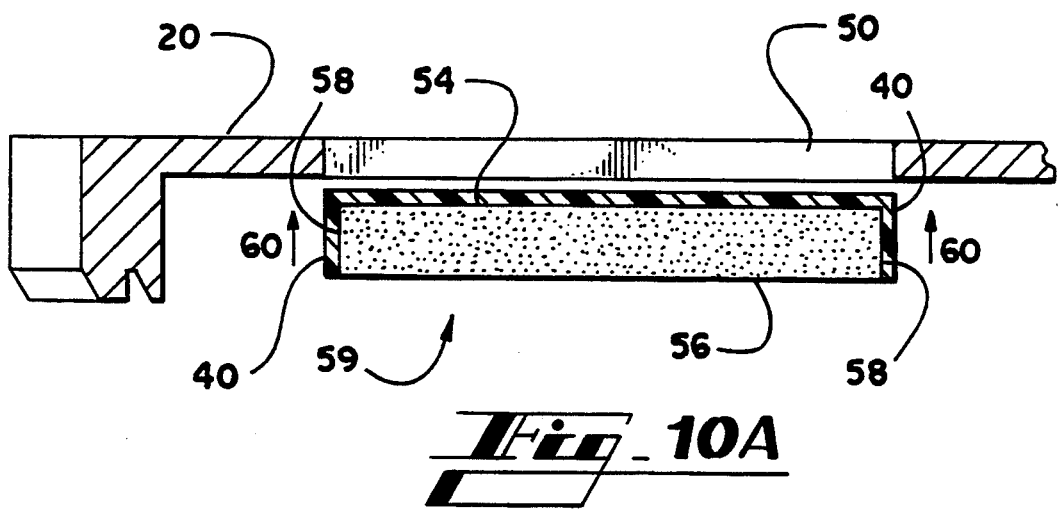
FIG. 10a shows an exploded cross-sectional view of another alternate embodiment of the present invention.
Figure 10B:
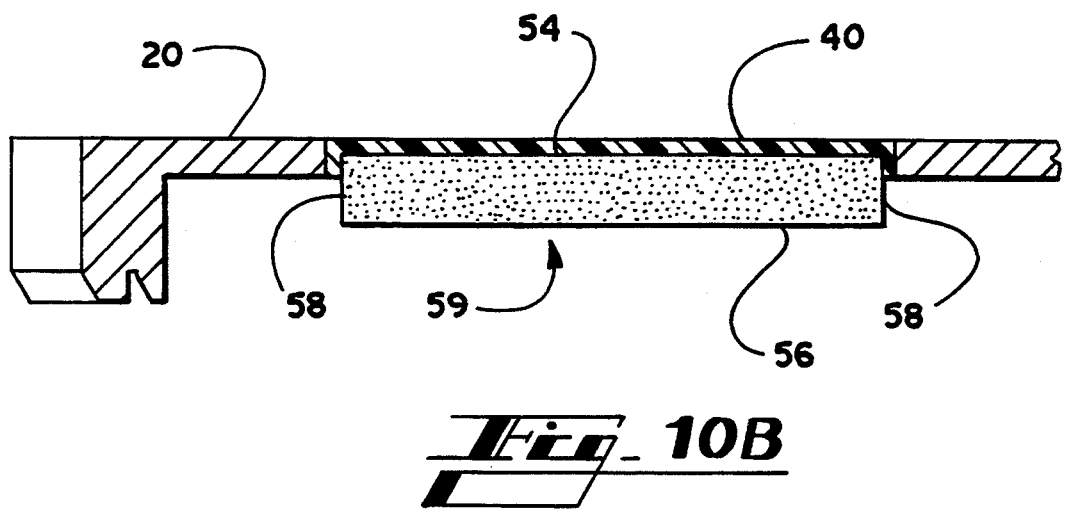

Referring to FIG. 10a, another embodiment of a vent system 59 is shown which is similar to the vent construction illustrated in FIG. 9. The vent system 59 illustrated in FIG. 10a differs from the vent system illustrated in FIG. 9 in that a gas-permeable, hydrophobic membrane covers the diffuser exterior surface 54 of the gas diffuser 42 rather than the interior surface 56 of the gas diffuser 42 as shown in FIG. 9. FIG. 10b depicts an assembled view of the embodiment shown in FIG. 10a. Referring to FIG. 11a, a vent system 61 is similar in construction to the embodiments illustrated in FIG. 9 and FIG. 10 except that the entire surface of the diffuser 42 is covered by the gas-permeable, hydrophobic membrane 40. FIG. 11b depicts an assembled view of the embodiment shown in FIG. 11a. In each of the embodiments of FIG. 9, FIG. 10 and FIG. 11, the diffuser may be snugly positioned or fitted within the opening 50 by pressing the diffuser into the opening in the direction indicated by the direction arrows 60. Referring to FIG. 12, a top view of any of the embodiments of the vent system 58, 59, or 61 illustrated in FIGS. 9-11 is shown. The embodiment depicts the vents in a diagonal array as discussed above.

It should be appreciated that the embodiments shown in FIGS. 9-11 provide similar cell vent control mechanisms, as discussed above, through the use of various combinations and structures of the gas-permeable, hydrophobic membranes, openings, diffuser materials, and cell case sections. The embodiments shown in FIGS. 9-11, however, allow more carbon dioxide to enter the cell than the embodiments shown in FIGS. 2, 3, and 6-8. The moisture control for any given structure will vary depending upon the combination of, number of, or size of the various components used as part of the vent system 10. The embodiments illustrated are given by way of example, and many variations may be readily discerned by those skilled in the art and fall within the scope of the present invention.

In contrast to the present invention, mechanisms which open and close to vent gases from a cell may allow electrolyte to escape from the cell or may allow contaminants such as carbon dioxide to enter the cell. The equilibrium vapor pressure of the cell could also vary depending upon the length of time in which the mechanical devices were opened and upon the relative humidity of the atmosphere. The ambient air which enters the cell during such a process may cause the metal-air cell to fail. If the equilibrium vapor pressure of the ambient air is high, then the battery may fail due to flooding. If the equilibrium vapor pressure of the ambient air is low, then the battery may fail due to a condition called drying out. With optimum control of the hermeticity of the cell during exhaustion of gases, failure or performance losses due to the ambient air or electrolyte leakage may be better controlled. The vent system of the present invention exhausts gases generated by the cell while minimizing the above discussed effects of exposure to an excessive amount of ambient air.

Referring again to FIG. 2, electrode lead 33 is attached to and extends up from the cathode 22 along the peripheral side wall 21 of the case body 18 to fit through the seam 34 between the case body 18 and the case lid 24. The arrangement of the electrode lid 33 of the present invention provides the advantage of yielding a hermetically sealed case for a battery structure in which the electrodes of the cell are spaced at varying distances from the seam 34 of the case 12.

In plastic battery cases, it is often a difficult manufacturing task to extend an electrode contact through an opening in the battery case in a manner that provides a leak proof seal around the electrode as it passes through the hole in the case. The present invention provides an electrode lead for an electrode that is displaced a distance from the plane between the two case sections in which the seam 34 is formed. The seal around the cathode lead 33 of the present invention is leak proof and simple to manufacture. The electrode lead is made of a conducting material that may be a wire mesh or a perforated tab. It may be an integral extension of a conductive cathode current collector screen. Instead of providing the plastic case 12 that houses the battery cell with an opening so that the electrode lead may pass directly out of the case in the plane of the electrode 32, the electrode lead 33 is extended from the electrode 22 to pass through the seam 34. The electrode lead 33 is first attached to or formed integrally with the electrode 22. Then the lead is extended along the cell side wall 21 and is bent out of the case at the seam 34. The plastic lid 24 of the case 12 is welded to the lower section 18 of the case, and the heated plastic extrudes through the perforated holes of the electrode lead. When the plastic cools, it contracts around the metal causing an injection molded type metal-to-plastic seal which is highly resistant to leakage. By sealing and constructing the cathode lead 33 as described above, the manufacture of a leak proof seal around the electrode lead 33 is provided.

The foregoing relates only to the preferred embodiment of the present invention, and many changes may be made therein without departing from the scope of the invention as defined by the following claims.

I claim:

1. A system for venting gas from within a case housing an electrochemical metal air cell having an anode and a cathode with a separator positioned therebetween, said case having, an interior surface and an exterior surface, comprising:
   at least one recess defined on the interior surface of said case on the anode side of said separator, said recess extending towards the exterior surface of said case, so as to define a gas collection area; and
   at least one gas exit hole communicating with the atmosphere, having a smaller cross-sectional area than the cross-sectional area of said recess, extending from the exterior surface of said case to said recess.

2. The apparatus of claim 1 further comprising, a gas-permeable, hydrophobic membrane attached to said interior surface of said case so as to cover said recess thereby defining a boundary of said gas collection area.

3. The apparatus of claim 1 further comprising a gas diffuser having a plurality of pores, located within said gas collection area covering said gas exit hole and retained within said recess.

4. The apparatus of claim 3 wherein said gas diffuser is positioned within said recess to provide structural support to said case.

5. The apparatus of claim 3 wherein the diameter of said pores of said gas diffuser range from 1–20 microns.

6. The apparatus of claim 3 further comprising a second gas-permeable, hydrophobic membrane covering said gas exit hole and located between said gas diffuser and said gas exit hole.

7. The apparatus of claim 1 wherein said recess has a geometric center and wherein said gas exit hole is located at the geometric center of said recess.

8. The apparatus of claim 7 wherein the perimeter of said recess is circular in shape.

9. The apparatus of claim 1 wherein the cross-sectional area of said recess is approximately 0.4 square inches.

10. The apparatus of claim 9 wherein the cross-sectional area of said gas exit hole ranges from 0.0003 to 0.008 square inches.

11. The apparatus of claim 1 wherein said size of said gas exit hole is sufficiently small to prevent excessive carbon dioxide intake from the atmosphere.

12. The apparatus of claim 1 wherein said size of said exit hole is sufficiently small to prevent excess liquid loss from said cell.

13. The apparatus of claim 1 wherein said cross-sectional area of said gas exit hole ranges from 0.0003 to 0.008 square inches.

14. A system for venting gas from within a case housing an electrochemical metal air cell having an anode and a cathode with a separator positioned therebetween, said case having an interior surface and an exterior surface, comprising:
   at least one recess defined on the interior surface of said case on the anode side of said separator, said recess extending towards the exterior surface of said case, so as to define a gas collection area;
   at least one gas exit hole communicating with the atmosphere, having a smaller cross-sectional area than the cross-sectional area of said recess, extending from the exterior surface of said case to said recess; and
   a gas-permeable, hydrophobic membrane attached to the surface of said case within said recess and covering said gas exit hole.

15. The apparatus of claim 14 further comprising a gas diffuser having a plurality of pores, located within said gas collection area, covering said gas exit hole and attached to said recess.

16. The apparatus of claim 15 wherein the diameter of said pores of said gas diffuser range from 1–20 microns.

17. The apparatus of claim 14 wherein said gas exit hole is located at the geometric center of said recess.

18. The apparatus of claim 14 wherein the perimeter of said recess is circular in shape.

19. The apparatus of claim 14 wherein said cross-sectional area of said recess is approximately 0.4 square inches.

20. The apparatus of claim 14 wherein said size of said gas exit hole is sufficiently small to prevent excessive carbon dioxide intake from the atmosphere.

21. The apparatus of claim 14 wherein said exit hole is sized to prevent excess water loss from the cell.

22. The apparatus of claim 14 wherein said cross-sectional area of said gas exit hole range from 0.0003 to 0.008 square inches.

23. A system for venting gas from within a case housing an electrochemical metal air cell having an anode and a cathode with a separator positioned therebetween, said case having an interior surface and an exterior surface, comprising:
   at least one gas exit hole defined from the exterior of said case to the interior of said case on the anode side of said separator, said gas exit hole being sufficiently small to prevent excessive carbon dioxide intake from the atmosphere and to prevent excessive water loss from said cell; and
   at least one gas diffuser, having a plurality of pores, attached along the interior surface of said case and covering said gas exit hole.

24. The apparatus of claim 23 wherein the cross sectional area of said gas exit hole ranges from 0.0003 to 0.008 square inches.

25. The apparatus of claim 24 wherein the diameter of said pores of said gas diffuser range from 1-20 microns.

26. The apparatus of claim 23 further comprising, a gas-permeable, hydrophobic membrane attached to said interior surface of said case so as to cover said gas diffuser thereby defining a boundary for a gas collection area.

27. The apparatus of claim 26 further comprising a second gas-permeable, hydrophobic membrane located between said gas diffuser and said interior surface of said case.

28. The apparatus of claim 27 wherein said gas exit hole is located at the geometric center of said gas diffuser.

29. The apparatus of claim 27 wherein the perimeter of said gas diffuser is circular in shape.

30. A system for venting gas from within a case housing an electrochemical metal air cell having an anode and a cathode with a separator positioned therebetween, said case having an interior surface and an exterior surface, comprising:
   an opening defined in said case and extending through the exterior surface of said case to the interior surface of said case on the anode side of said separator; and
   a gas diffuser having a plurality of pores and having a diffuser exterior surface, a diffuser interior surface, and a diffuser peripheral surface therebetween, said diffuser being positioned to fill said opening with said diffuser exterior surface facing outwardly.

31. The apparatus of claim 30 further comprising a gas-permeable, hydrophobic membrane covering said diffuser interior surface to help maintain the humidity within said case.

32. The apparatus of claim 31 wherein said membrane covers said diffuser peripheral surface and said diffuser interior surface to help maintain the humidity of said cell.

33. The apparatus of claim 30 further comprising, a gas-permeable, hydrophobic membrane covering said diffuser exterior surface.

34. The apparatus of claim 33 wherein said membrane covers said diffuser peripheral surface and said diffuser exterior surface.

35. The apparatus of claim 34 wherein the diameter of said pores of said gas diffuser range approximately from 1-20 microns.

36. The apparatus of claim 35 wherein the cross-sectional area of said opening is approximately 0.2 square inches.

37. A system for venting gas from within a case housing an electrochemical metal air cell, said case having an interior surface and an exterior surface and said case defining a volume, comprising:
   an electrolyte partially filling the volume of said case, thereby defining a fluid volume and a gas volume within said case;
   a plurality of gas exit holes, communicating with the atmosphere, defined from the exterior of said case to the interior of said case so as to exhaust gas from said gas volume, said case having an initial horizontal position defined by the position in which said gas exit holes located on a surface of said case face upward, said exit holes being spaced apart such that at least one of said gas exit holes is located above the maximum fluid level of said fluid volume for any position of orientation of said case from said horizontal position to at least a 90° vertical orientation of said case so that at least said one of said gas exit holes communicates with said gas volume; and
   each of said gas exit holes being covered by a gas-permeable, hydrophobic membrane attached to said case.

38. The apparatus of claim 37 wherein said case comprises a plurality of case sections sealed together, thereby defining a closed cell case, and wherein said at least one of said gas exit holes extends through at least one of said case sections.

39. The apparatus of claim 38 wherein said plurality of gas exit holes each extend through the same case section.

40. The apparatus of claim 39 wherein the perimeter of at least one of said case sections is polygonal in shape.

41. The apparatus of claim 40 wherein said plurality of gas exit holes are aligned in a diagonal array from one corner of said perimeter to the oppositely opposed corner of said perimeter.

42. The apparatus of claim 40 wherein said gas exit holes are aligned from one corner of said perimeter to the oppositely opposed side of said perimeter.

43. The apparatus of claim 40 wherein a plurality of said gas exit holes are positioned near the corners of said perimeter.

44. The apparatus of claim 43 wherein at least one of said gas exit holes is positioned in a center portion of one of said case sections.

45. The apparatus of claim 38 wherein at least one of said gas exit holes is positioned in a center portion of said one case section.

46. The apparatus of claim 2 wherein said gas collection area projects inwardly from said interior surface of said case and further comprising a gas permeable structure supporting said membrane.

47. The apparatus of claim 26 wherein said gas collection area projects inwardly from said interior surface of said case.

48. A system for venting gas from within a case housing a rechargeable electrochemical metal-air cell having an anode and a cathode with a separator positioned therebetween, said case having an interior surface and an exterior surface, comprising:

at least one recess defined on the interior surface of said case on the anode side of said separator, said recess extending towards the exterior surface of said case, so as to define a gas collection area; and at least one gas exit hole communicating with the atmosphere, having a smaller cross-sectional area than the cross-sectional area of said recess, extending from the exterior surface of said case to said recess.

49. A system for venting gas from within a case housing a rechargeable electrochemical metal-air cell having an anode and a cathode with a separator positioned therebetween, said case having an interior surface and an exterior surface, comprising:

at least one gas exit hole defined from the exterior of said case to the interior of said case on the anode side of said separator, said gas exit hole being sufficiently small to prevent excessive carbon dioxide intake from the atmosphere and to prevent excessive water loss from said cell; and at least one gas diffuser, having a plurality of pores, attached along the interior surface of said case and covering said gas exit hole.

* * * * *